US012712595B2

(12) United States Patent
Pecile et al.

(10) Patent No.: US 12,712,595 B2
(45) Date of Patent: Aug. 18, 2026

(54) LOW FREQUENCY COMMUNICATION SYSTEM OVER POWER LINES

(71) Applicant: Myers Emergency Power Systems LLC, Bethlehem, PA (US)

(72) Inventors: Conrad Pecile, Hellertown, PA (US); Leon Hermans, San Leandro, CA (US); Subrata Mondal, Bethlehem, PA (US)

(73) Assignee: Myers Emergency Power Systems LLC, Bethlehem, PA (US)

( * ) Notice: Subject to any disclaimer, the term of this patent is extended or adjusted under 35 U.S.C. 154(b) by 133 days.

(21) Appl. No.: 18/362,540

(22) Filed: Jul. 31, 2023

(65) Prior Publication Data

US 2024/0039579 A1 Feb. 1, 2024

Related U.S. Application Data

(60) Provisional application No. 63/393,946, filed on Jul. 31, 2022.

(51) Int. Cl.
*H04B 3/56* (2006.01)
*H04L 67/125* (2022.01)

(52) U.S. Cl.
CPC ............. *H04B 3/56* (2013.01); *H04L 67/125* (2013.01)

(58) Field of Classification Search
CPC ...... H02J 9/00; H02J 9/04; H02J 9/062; H02J 9/065; H04B 3/54; H04B 3/542
See application file for complete search history.

(56) References Cited

U.S. PATENT DOCUMENTS

2012/0091817 A1* 4/2012 Seymour ................ H02J 3/381 363/71
2014/0268958 A1* 9/2014 Chapman ............... H02J 3/381 363/97
2016/0126783 A1* 5/2016 Cheng .................... H02J 9/062 307/66

* cited by examiner

*Primary Examiner* — Rexford N Barnie
*Assistant Examiner* — Thai H Tran
(74) *Attorney, Agent, or Firm* — Potomac Law Group, PLLC; Brian H Buck; Vincent M DeLuca

(57) ABSTRACT

An apparatus and method for transmitting information from an emergency power system (EPS) to control devices of remotely connected loads without any additional hardware or wiring. The EPS causes the frequency, phase or magnitude of an AC power signal to be varied according to an established protocol, that is detected by the remote control device, which operates the load in accordance with the protocol.

10 Claims, 14 Drawing Sheets

LOW FREQUENCY COMMUNICATION SYSTEM OVER POWER LINES

BACKGROUND OF THE INVENTION

An emergency power source, hereafter referred to as EPS, is used to provide backup power to critical loads in an electrical system, such as a lighting system of a building. A complete Emergency Power System is comprised of an EPS, control devices, and connected loads. It is important that the health of all of the components in the emergency power system is known so that in the event of a utility line failure all of the control devices will operate to support the load for the designated period of time. Conventional EPS systems rely on a few different approaches to ensure the required monthly and yearly test of the emergency system is performed. The first approach requires human intervention to simulate a failure of the utility line by opening the main utility input circuit to the EPS, transfer the load to the EPS, and to verify/record that each device in the emergency circuit is operating properly. This approach is extremely time consuming since there are typically hundreds of devices in a system requiring many smaller sub-sections to be tested or many people verifying/recording designated sections of the building.

A second approach requires "smart devices" to be utilized in the emergency systems that will automatically execute the test(s) and verify/record the results for the critical loads connected. This approach still requires costly human intervention to periodically check if any of the devices are reporting an alarm and requires a common communication system with every smart device connected to it. A third approach utilizes the EPS to automatically perform the required periodic testing and verify/record the results of the tests. Theoretically this approach is superior because the results of tests are documented and stored in one location that is easy for the building operator to access. In recent years this method became more complex and more costly during installation due to the adoption of green building requirements in many areas where devices need to operate in a low power mode or be completely shut down when not in use or in cases where the building space is not occupied. This requirement made the traditional approach of automatic self-testing less cost effective because it requires a common communication platform with every emergency device connected to it, or providing separate control wires to every emergency device so that each device knows when a test is being performed and to ensure the circuits that they are controlling are in test mode as well.

Many applications require EPS systems to back up critical loads in case of an emergency and there are different ways to ensure that the load will be supported in cases where the primary source failed. Two common EPS electronic based topologies used in the industry are the double conversion UPS topology and the off-line UPS topology. The double conversion topology has a separate battery charger that operates from the AC line connected to the batteries and a separate output source that supplies the battery power to the loads. Off-line systems use the same power section to operate in converter mode float charging the batteries while the utility power is in tolerance or in inverter mode supporting the load from the batteries when utility power is out of tolerance. In addition there are mechanical systems such as generators that also have control of the output frequency during an emergency event where this patent will also apply.

FIG. 1 is a block diagram of a prior art control device. The control device 5 is connected to the EPS 10, to the utility power source 6 and to a lighting control device 32. When the utility source 6 is present and available, switching element 30 will control the loads 7 in accordance with commands from the lighting control 32 sent to control logic 31. When the utility source 6 is unavailable or interrupted, the control logic 31 will detect this interruption and sends a command to the switching element 30 to force the load 7 to the "on" or illuminated state, with power being supplied by the EPS 10. In the case of dimming systems, the load will be set to a pre-set or undimmed level. In this type of emergency system, the control device 5 must be connected to the utility source 6 independently and ahead of the EPS 10, which requires additional wiring and labor. Additionally, when the EPS 10 is in a test mode, the control logic 31 is not able to detect or respond to the test mode, unless further additional wiring is connected via other inputs 33. Further, in order to respond to fire alarm signals, the fire alarm must be connected to other inputs 33.

Prior art methods have the following disadvantages with respect to ensuring all of the control devices that are connected to the EPS are powering their respective loads during a planned executed test. Some methods require a signal from the EPS via separate control trigger wires that are connected to each of the devices. This can be hundred or even thousands of different devices all over the building that would require an additional pair of wires. Other methods require the EPS to interrupt the power to the device for a specified time period, typically 2 seconds, and reconnect the power to the device. The device will be forced in emergency mode for the full 90 minutes independent of the type of event that may have occurred. There is no discrimination between a remote test executed by the user that can be 1 minute, an actual emergency event, or a monthly/yearly automatic test performed by the EPS. Additionally, this method is no longer accepted under certain codes, such as UL924, a standard for emergency lighting equipment. In other industries, communication over power lines (PLC) has been performed by modulating a higher frequency that contains the information on top of the fundamental low frequency. However, PLC technology has issues when used with AC line filters, isolation transformers, many connected devices, and long distance power lines.

The present invention addresses the aforementioned limitations of the prior art by providing an apparatus and method that transmits information to the control devices of the connected loads automatically anytime the EPS is operating in emergency mode. This function is performed without any additional hardware or wiring, simplifying the installation and cost of installing the EPS system.

SUMMARY OF THE INVENTION

It is an object of the present invention to illustrate a low frequency communication transmission method that could be an integral part of any EPS having control of the frequency on the power lines of the connected devices.

Another aspect of the present invention illustrates methods for the low frequency communication transmission to contain commands encoded as a digital representation within the transmitted power output allowing connected devices to receive complex commands over the power lines.

Yet another object of the present invention illustrates methods for the connected devices to receive the frequency communication transmission, discriminate the information, and to perform different functions based on the transmitted data.

According to the invention, an EPS is disclosed that will illustrate a simple, low cost, method for testing all the devices under load without additional wires or complex control systems. The system is comprised of a standard EPS, that includes a control system and power section that can vary the output frequency. This invention can be used in any system that contains an AC utility as the primary source and an EPS that is used to support the critical loads when the primary source has failed.

This invention provides an arrangement for communication between any EPS and any of the loads connected to the power lines of the EPS. Although this invention can be used on many different EPS topologies, for illustrative purposes an off-line UPS (Uninterruptible Power Supply), an emergency control device, and a LED fixture will be described as an embodiment of the invention. The control for the UPS is comprised of two modes of operation: battery charging mode and emergency mode. In an off-line topology, the AC utility source is connected or disconnected to the load via a static switch and/or an electromechanical switch. In the battery charging mode, the control will phase lock to the AC utility source, pass the source to the load, and charge the batteries by regulating the charging current to the batteries. The emergency mode is activated when the utility line reaches an out of tolerance condition or a test is to be performed. In the emergency mode, the control of the EPS will disconnect the AC utility source, and connect the loads to emergency power, which involves inverting the DC Battery to an AC waveform and controlling the output voltage and frequency to support the connected loads.

The most common reason for emergency mode is an actual emergency condition. However, this mode also may be activated by a user or building management system command (such as a fire alarm) or automatically by a pre-programmed set point in the control when a test of the emergency system is performed. While operating in emergency mode, the UPS has complete control of the output voltage and frequency generated. At this time, the UPS control can set the output frequency to be slightly different from the standard line frequency. For example, 59.5 Hz rather than 60.0 Hz. This frequency change signals to the downstream emergency control devices that emergency mode is in process. This change of fundamental frequency will be seen by any device connected to the power lines of the UPS.

In addition to the change of output frequency that occurs in the UPS control, the function of detecting the changed frequency by the emergency control device(s) powered by the UPS is also contemplated by the invention.

As will be clear to a person of ordinary skill in the art, the present invention provides a useful method for communication between an EPS and downstream devices that are connected to the power lines of the EPS. The communication is transmitted over the power lines without need for additional power or control wires connected to the downstream devices. Using the fundamental frequency as the medium of communication eliminates any issues with distance, isolation transformers, filter circuits, or other negative effects with data contained in a carrier frequency riding on the fundamental frequency. The transmitted communication via fundamental output frequency variation can be as simple as fixed frequency for a specified time period to indicate the start/completion of emergency mode or as complex as a digital code delineated by frequency, for example digital "0" can be represented by a lower frequency as compared to the fundamental frequency, (e.g. 59.5 Hz) and digital "1" can be represented by a higher frequency as compared to the fundamental frequency (g. 60.5 Hz). This allows for sequential patterns of 0s and 1s to be sent to the downstream devices, in accordance with code words established by the system. The digits may be formed into a packet or byte, and a series of bytes may form a command protocol. The downstream devices have a detection algorithm that directly measures the frequency of the power supply current or voltage being received, and detects a code based on the value. Alternatively, the algorithm may measure the phase shift relative to a reference frequency, such as 60 Hz in the USA, and determine the code. Advanced communication may be enabled using a number of different code words that make up the protocol, allowing many different commands to exist as well as having the ability to individually address downstream devices or address specific groups of downstream devices.

BRIEF DESCRIPTION OF THE DRAWINGS

The following figures, where like elements are denoted by like reference numerals, will provide a more detailed understanding of the invention in conjunction with the following detailed description, in which.

DETAILED DESCRIPTION OF PREFERRED EMBODIMENTS OF THE INVENTION

The following examples illustrate one embodiment of the invention for purposes of explanation and are not intended to describe all possible further embodiments which will be apparent to those skilled in the art from this detailed description. For example, single phase topologies are discussed and shown but the invention equally applies to three phase systems with exactly the same principles. Further, a battery-based UPS is illustrated as the EPS, but the present invention could be applied to a generator-based system as well. All such variations as would be recognized by those skilled in the art from this disclosure are intended to be covered by the following claims.

Figure 2:
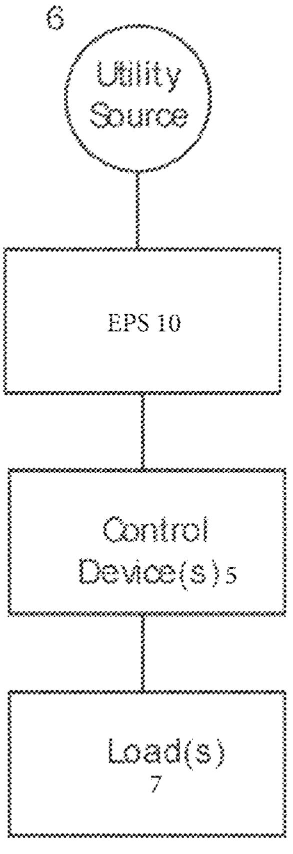
FIG. 2 is a simplified block diagram illustrating the elementary topology of the Emergency Power System according to one embodiment of the invention.

FIG. 2 illustrates the simplest form factor of the present invention with a utility source 6, EPS 10, control device(s) 5, and load(s) 7. The EPS 10 can be in the form of an electronic device, UPS, or a mechanical device such as a generator. The minimum requirement of the backup power source 10 is that during emergency mode the backup power source must have the ability to control the output frequency that will be transmitted to the downstream control devices 5 within the emergency power system. The downstream control devices 5 can be an integral part of the load 7 or a separate control device such as a UL924 shunt bypass relay.

Figure 3A:
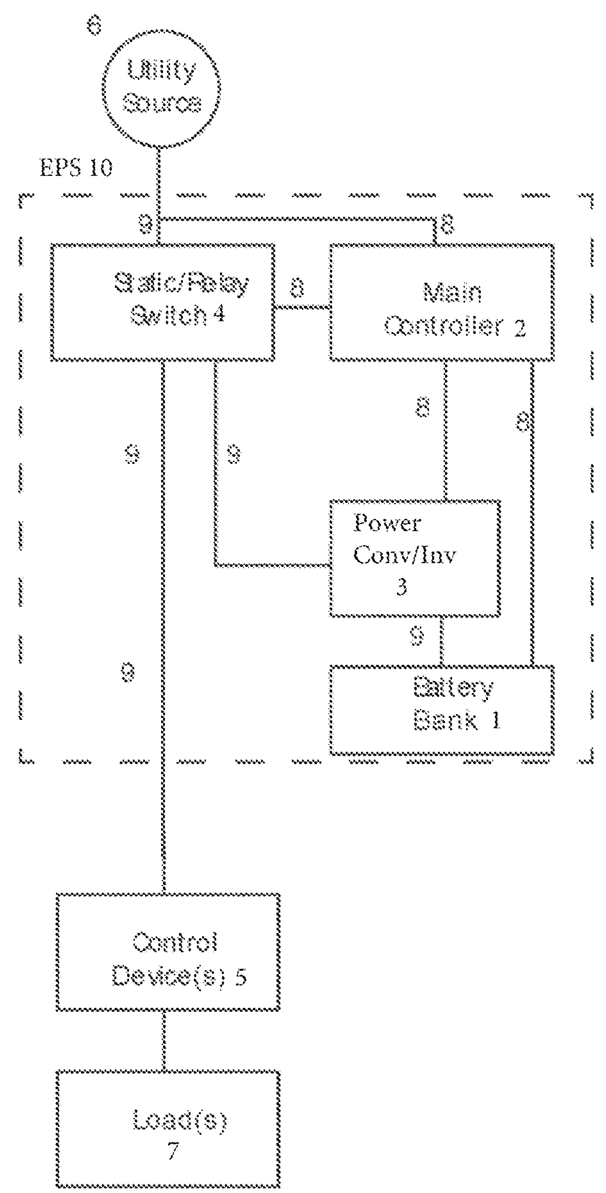
FIG. 3A is a block diagram illustrating the components of the EPS 10 of FIG. 1 according to an embodiment of the invention.

FIG. 3A shows an emergency power system in which the Emergency Power Supply (EPS)10 has an off-line uninterruptible power supply (UPS) topology. The UPS includes a battery bank 1, a power converter/inverter 3, a main controller 2, control/sensor lines 8, power lines 9, and a static or relay switch 4. The control lines 8 which are used to control the flow of power as well as collect the information from the instrumentation used by the main controller. The power lines 9 (in bold) depict the main power flow through the system. The power flow is bi-directional and for each operating mode the power flow can change in magnitude and direction. The components outside of the EPS system 10 are a utility source 6, control device 5, and AC load 7. The utility source 6 is the main supply of the power to the control devices 5 and AC load 7 unless the main controller 2 detects a problem with the magnitude, phase, or frequency of the power signal from the utility source 6. There are many different types of known controllers 2 that perform different functions on the AC load that is dependent on the type of load being powered.

Figure 3B:
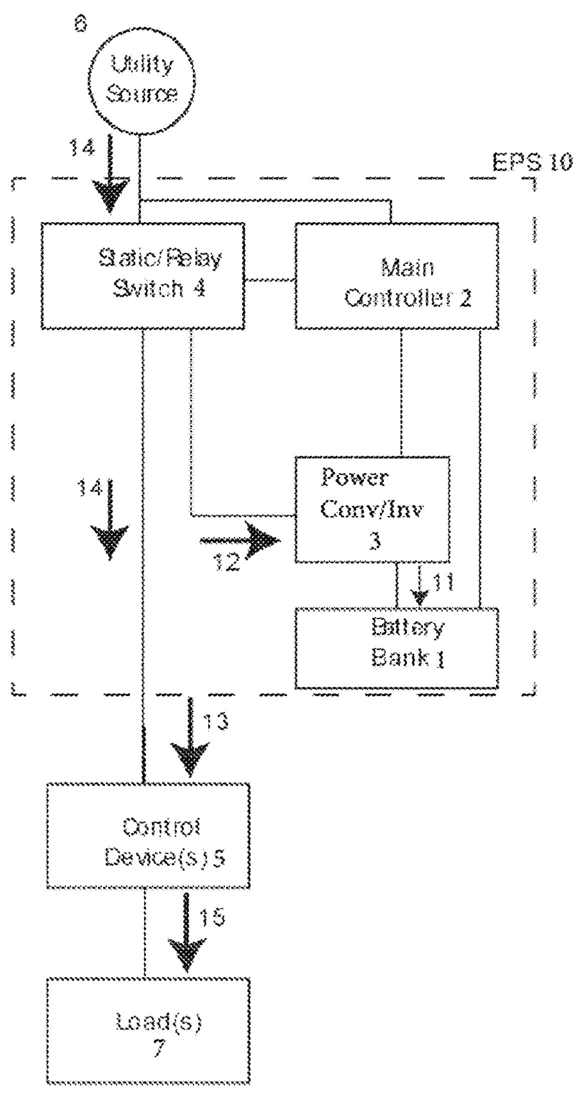
FIG. 3B is a block diagram illustrating the EPS topology during a battery charging mode illustrating power flow direction.

FIG. 3B illustrates the power flow for battery charging mode. The battery charging mode is the normal operating mode for the off-line UPS topology, i.e. when the utility power source 6 is available and operating correctly. The static/relay switch 4 is a bi-directional switch that allows current to flow in either direction from the utility source 6 when closed and no current to flow when it is open. The function of the static switch 4 is two-fold; first and foremost it prevents the backup EPS system 10 from supplying power to the load 7 from the battery bank 1 when the utility source 6 is present, i.e., when there is an available utility voltage. Secondly, it allows the utility source 6 to be instantaneously disconnected and connected to the load 7 under certain conditions. These conditions, monitored by the main controller 2, include: whether the voltage is within tolerance conditions; whether the frequency is within tolerance; whether the main controller 2 is phase-locked to the utility source 6; whether a test is being performed; and whether the utility source 6 has remained stable for a specified length of time. Phase-lock describes a condition that exists when the main controller's simulated sine wave reference is in phase with the utility source's voltage waveform. Once phase-lock is commanded the main controller 2 adjusts its local oscillator frequency until it meets the frequency of the utility source 6 and remains locked on the phase of the utility source 6 until the voltage or frequency of the utility source drifts out of tolerance or a test is commanded.

Once the main controller 2 confirms that all conditions are satisfied, the main controller 2 closes the static switch 4. Once the static switch 4 is closed, the battery charging process starts. The power converter/inverter 3 converts AC current from the utility source 6 to DC current to charge the battery bank 1 via path 13, 12 and 11. The arrows denoted by 11, 12, 13, 14, and 15 describe the current flow at one particular instant of time. The converter 3 receives commands from the main controller 2 through control lines 8 as shown in FIG. 3A and, in charging mode, transforms the AC current from the utility source 6 through the static switch 4 through power flow line 12, resulting with DC current through power flow line 11 to the battery bank 1 to charge the battery bank 1. The static switch 4 also allows AC current to flow through line 13 through the control device 5 to the AC load 7 through line 15.

A summary of the events during battery charging mode is as follows: the main controller 2 senses the state of utility source 6 via control lines 8 and phase locks to the incoming signal from utility source 6. Once phase lock is established and maintained, the main controller 2 closes the static switch 4, providing power from the utility source 6 to the AC to DC converter 3. The main controller 2 then causes the AC to DC converter 3 to convert the AC current from utility source 6 to DC current, and supplies the DC current to the battery bank 1 for charging. During this charging process, the main controller 2 monitors the battery bank 1 to regulate and monitor the charging event. In addition to the charging process, during charging mode the current from utility source 6 is passed through the static switch 4 through the control devices 5 to the AC load 7.

The detailed description to this point described only one of the possible topologies to which the invention applies under normal operating conditions. These are the conditions under which the emergency power system will operate for the majority of the time. The present invention provides a mechanism to communicate the state of operation to the downstream control devices 5 over the same power lines through which the power is supplied. This communication can occur only when the backup system 10 has control of the output frequency of the current signal being sent to the control device 5. This occurs when the emergency power system is operating in emergency mode which occurs when there is an out-of-tolerance condition of the utility source 6, or during a test mode when the emergency power system is performing a test to ensure that when an actual emergency situation arises the emergency system is ready and capable of supporting the downstream devices. A detailed description of emergency mode for an off-line UPS topology is as follows, with reference to FIG. 3C.

Figure 3C:
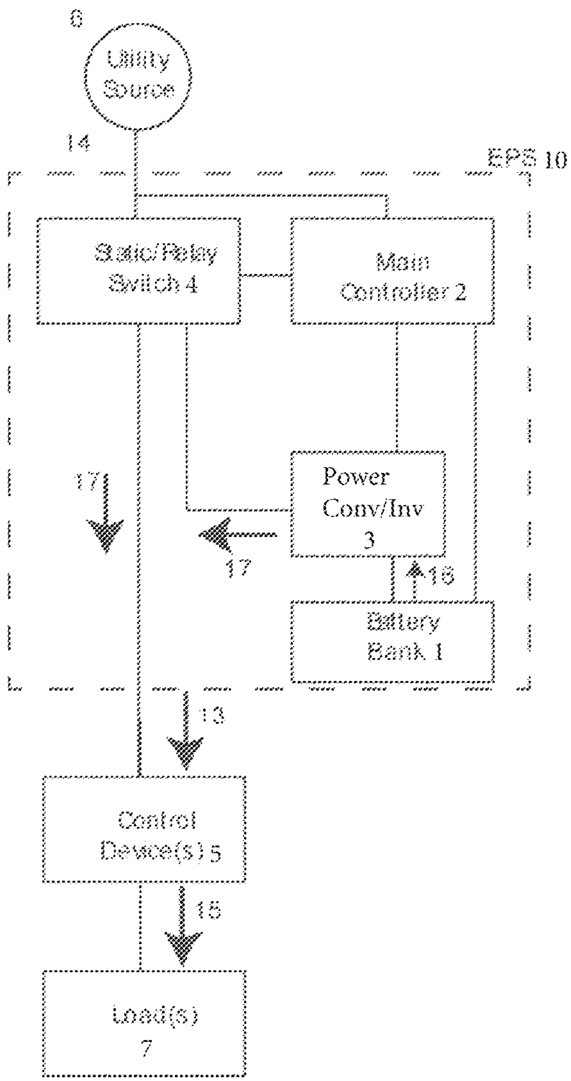
FIG. 3C is a block diagram illustrating the EPS topology during emergency mode or testing mode illustrating power flow direction.

The emergency mode of operation may occur for several reasons, which include a utility out-of-tolerance condition in voltage, a utility out-of-tolerance condition in frequency, inability of the main controller 2 to lock to the phase of the utility line, a fire alarm signal, other emergency conditions, or a test that can be either yearly, monthly, or manually. FIG. 3C is a connection diagram for an emergency mode of operation. If the main controller 2 detects one of the conditions as listed above the main controller 2 instantaneously switches the power converter/inverter 3 from an AC-to-DC converter to a DC-to-AC Inverter. At the same instant, the main controller 2 opens the static switch 4 so there is no power flow from the utility source 6. While operating in emergency mode the main controller 2 provides commands to the power converter/inverter 3 to convert the DC battery bank 1 into a regulated source of AC voltage and frequency that is supplied through the control device 5 to the load 7. The arrows denoted by 16, 17, 13, and 15 depict the current flow in emergency mode. DC current flows from the battery bank 1 into the DC to AC Inverter 3, which uses a mechanism such as pulse width modulation (PWM) to produce an alternating current signal via path 17 through the static switch 4, control device 5, and into the load 7.

As previously described, communication between the DC to AC Inverter 3 and the control devices 5 will occur during emergency mode because the main controller 2 will regulate both the voltage and the frequency of the signal produced by inverter 3 (e.g. via PWM). The variation in frequency (or voltage) is detected by the control device 5 independent of the distance between the EPS 10 and the control device 5, the number of connected loads 7, or the type of devices connected. In this way, the main controller 2 can send information in the form of codes to the control device 5 so that the control device 5 is able to determine the current state of operation. The codes may be in the form of digital bytes of data indicated by variations in the frequency and/or voltage of the signal supplied from the converter 3, as disclosed above.

Figure 4A:
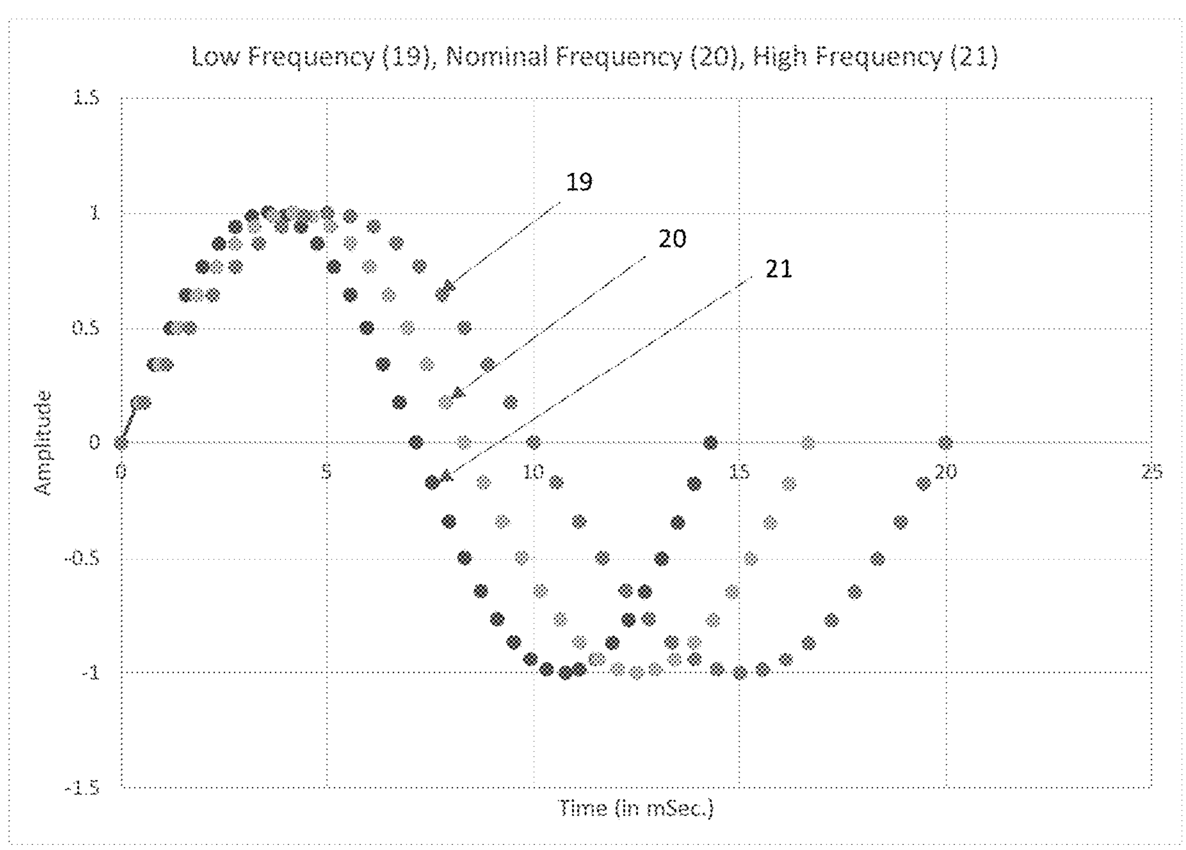
FIG. 4A illustrates waveforms of the three different frequencies that would be used when transmitting commands from the EPS system to the downstream devices.

FIG. 4A illustrates waveforms of one method of transmission and detection of a change in frequency. While the frequency change is represented by a change in magnitude of the fundamental frequency it is also forcing a phase shift from the fundamental frequency, such that the invention can achieve the same result with either a magnitude change or a phase shift from the fundamental frequency.

FIG. 4A shows three representative sine waves, overlayed so that the start of the sine wave cycle is in alignment. The three sinewaves 19, 20 and 21 represent a nominal frequency (in this example 60 Hz), a high frequency 21 that is a detectable frequency above the nominal frequency, and a low frequency 19 that is a detectable below the nominal frequency. There is not a significant relevance to the magnitude of the low and high frequency beyond that the frequency must be changed by an amount that is detectable by the control device 5.

Figure 4B:
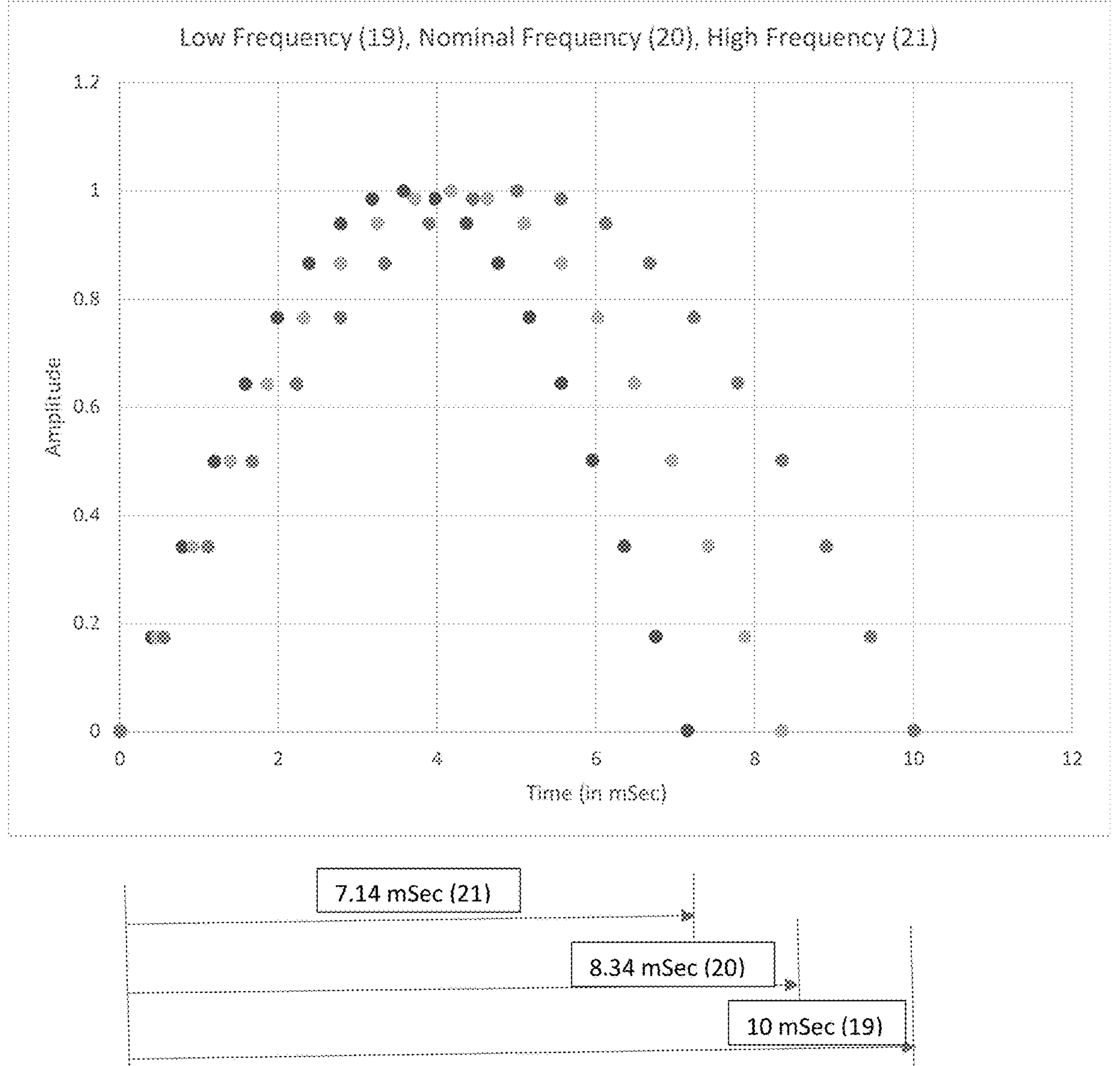
FIG. 4B illustrates time differences in waveforms that can be directly measured by the downstream control devices to determine the command transmitted by the backup system.

FIG. 4B illustrates the difference in time/phase shift between the nominal frequency and high frequency 21 and the difference in time/phase shift between the nominal frequency and low frequency 21. Each sine wave can change on a cycle by cycle basis because the main controller 2 sets the frequency that is seen at the control device 5 and load 7. The same frequency is supplied to all of the connected downstream devices 5 and 7 from the EPS 10.

The transmission portion of the communication system is controlled by the main controller 2 in emergency mode. In an illustrative example, each time the off-line UPS switches to emergency mode the frequency is set high for 2 seconds, and just prior to the UPS transferring back to normal (i.e. charging) mode the frequency is set low for 2 seconds. This keeps the net average frequency at the nominal value but allows for a pattern that the detection portion of the control device 5 and load 7 can easily detect. Another possible implementation is to keep the frequency high or low for the entire duration of the emergency mode. When the EPS leaves emergency mode, the frequency will automatically return to nominal since it is supplied by the utility source 6.

The receiver portion of the communication system is a control device, which is typically installed at a location from the transmission portion. A control device may include a UL924 or UL1008 listed Automatic Load Control, Shunt, Bypass Relay or Transfer Switch. The primary function of the control device is to allow one or more light fixtures to operate in both normal and emergency modes. In normal mode, the light fixture is able to be controlled ON and OFF as well as dimmed (in some cases). In emergency mode, the light fixture is not able to be controlled, and is locked on at a pre-set level (typically 100%) regardless of its prior control state. This allows the light to comply with regulations mandating automatic activation of emergency lighting under certain conditions (loss of utility power, fire alarm, or testing).

Figure 1:
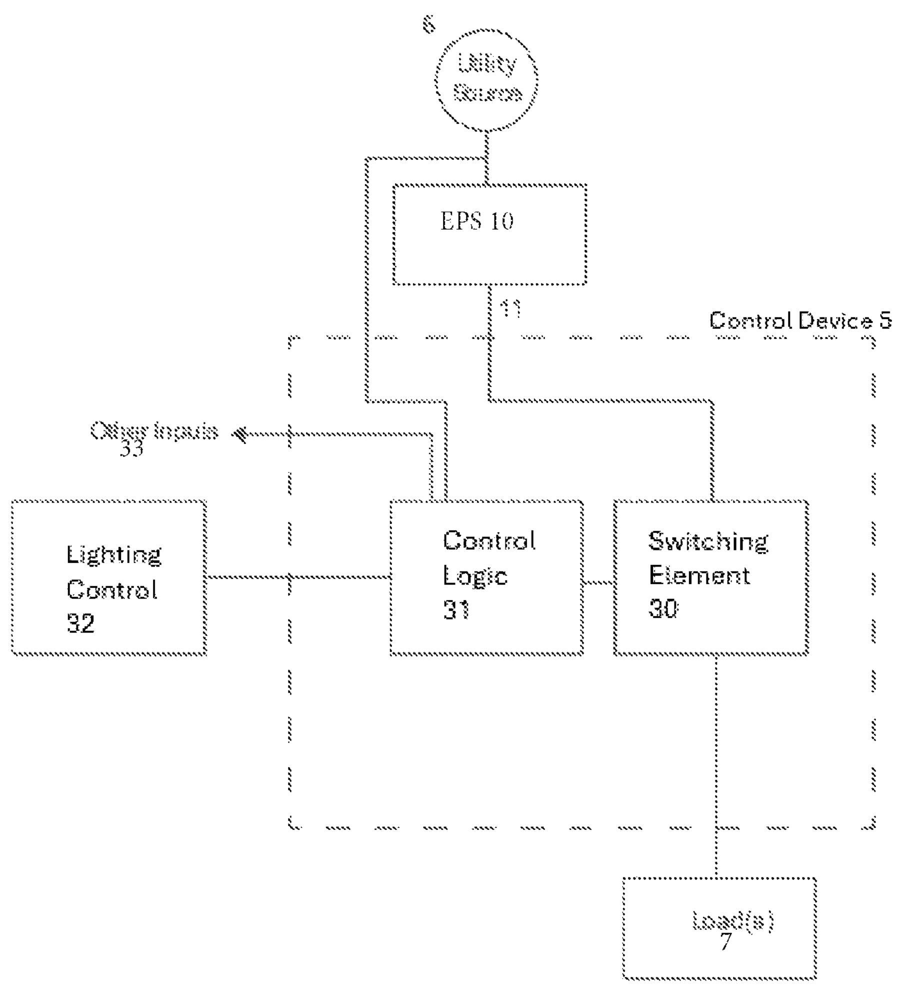
FIG. 1 is a block diagram of a prior art control device that requires direct connection to the utility source to detect a loss of utility power and switch to emergency mode.
Figure 5:
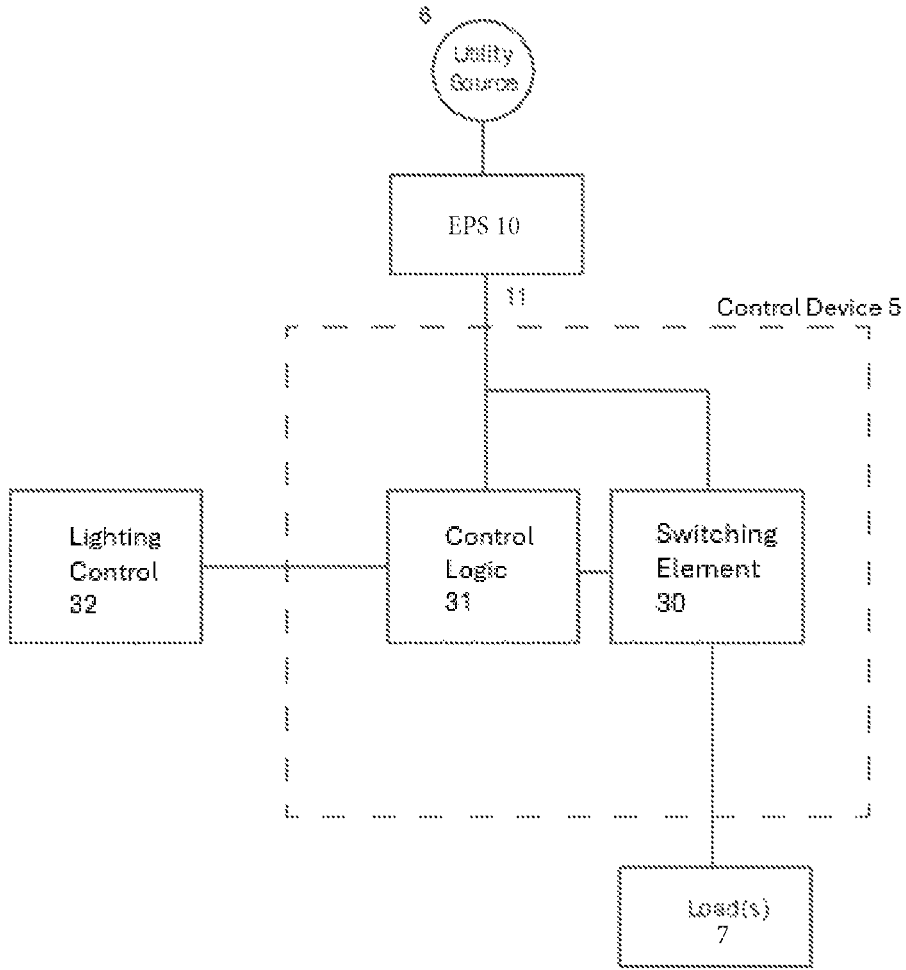
FIG. 5 is a block diagram of a control device capable of receiving, measuring, and activating according to the commands transmitted using frequency changes by the EPS according to the present invention.

FIG. 5 is a block diagram of a control device 5 utilizing the invention. The control device 5 does not require a connection directly to the utility power source 6, because it can detect a transition to emergency mode via the communication protocol on the powerline 11 from the EPS 10. When a frequency communication signal is received over the EPS power line 11, the control logic 31 interprets this and commands the switching element 30 accordingly. For example, when there is a main power outage, the main controller 2 detects this and commands the converter/inverter 3 to appropriately modulate the AC signal supplied to the control device (and load 7). The control logic 31 of control device 5 will detect this variation and interpret it according to the established code protocol. Thus, when a mains power outage has occurred, the control logic 31 will cause the switching element 30 to disconnect from the utility source 6 (see FIG. 1) and connect to the EPS 10. The EPS 10 is thus able to communicate utility source interruptions/losses, test modes, fire alarm signals, and other commands over the EPS power line 11, eliminating the need for other inputs 33 requiring additional lines and installations. This presents a significant savings opportunity because, for example, rather than connecting the fire alarm system to every control device 5, the fire alarm can be connected to only the EPS 10.

Figure 6A:
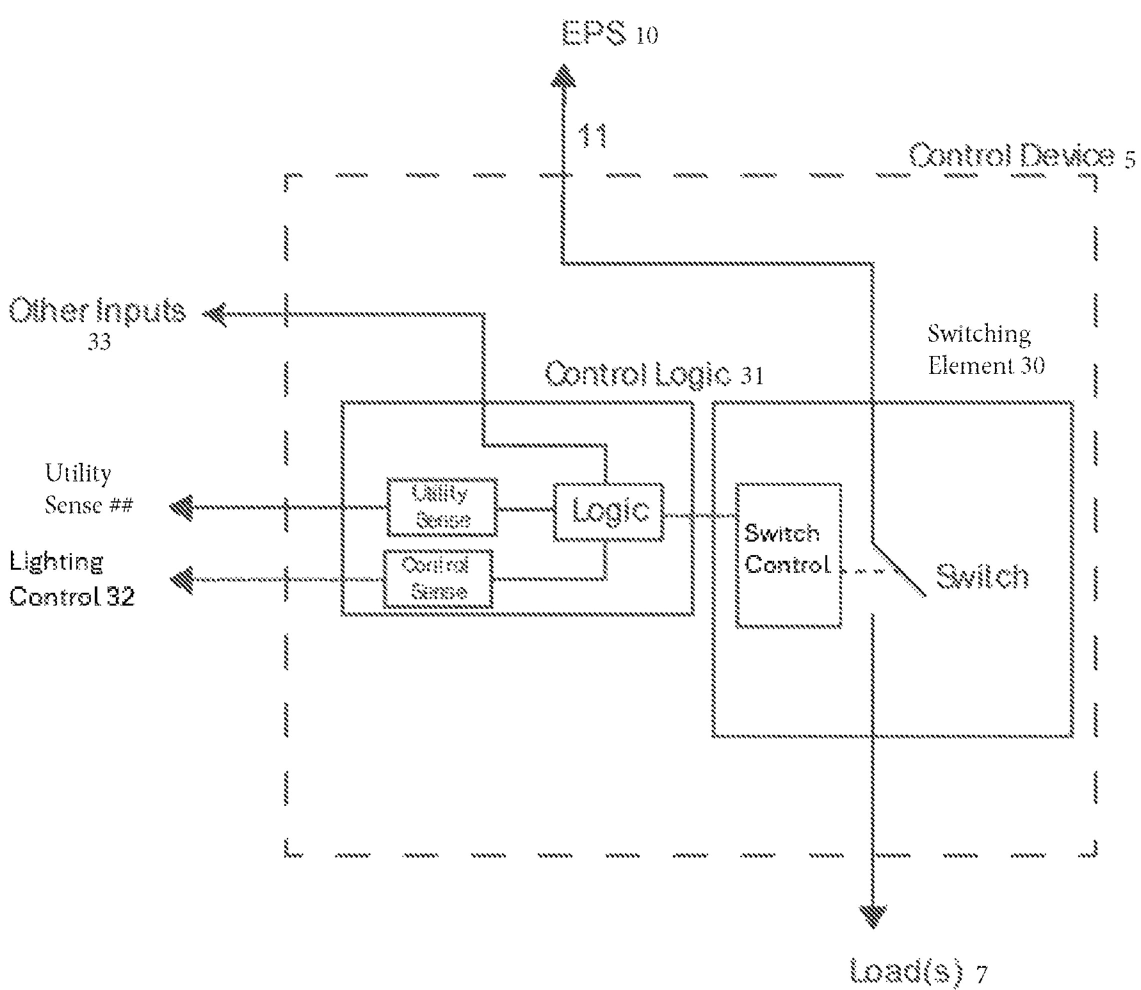
FIG. 6A is a block diagram of a prior art Automatic Load Control Relay (ALCR) type control device that requires direct connection to the utility source to detect a loss of utility power and switch to emergency mode.
Figure 6B:
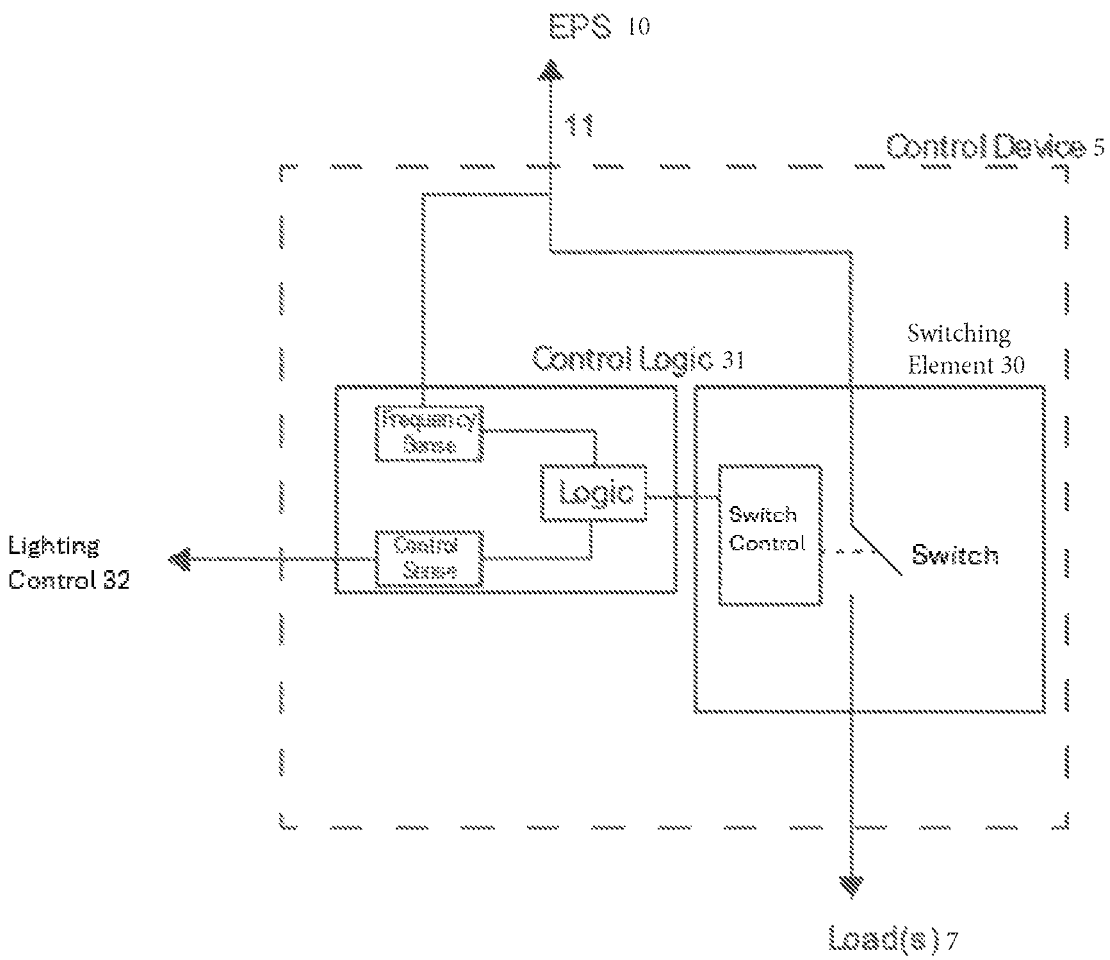
FIG. 6B is a block diagram of an ALCR control device according to an embodiment of the invention.

The following additional embodiments will now be described. FIG. 6A is a prior art Automatic Load Control Relay (ALCR) type control device, wherein like numerals denote like components as disclosed above. ALCR topology is used when there is a shared external lighting control that also controls non-emergency loads. The prior art ALCR control requires a utility sense and a control sense to set the switch position. This topology is used when there is a shared external lighting control that also controls non-emergency loads. FIG. 6B illustrates an ALCR control device in accordance with the present invention. As shown, using the present invention there is no need for a utility sense in the control logic.

Figure 7A:
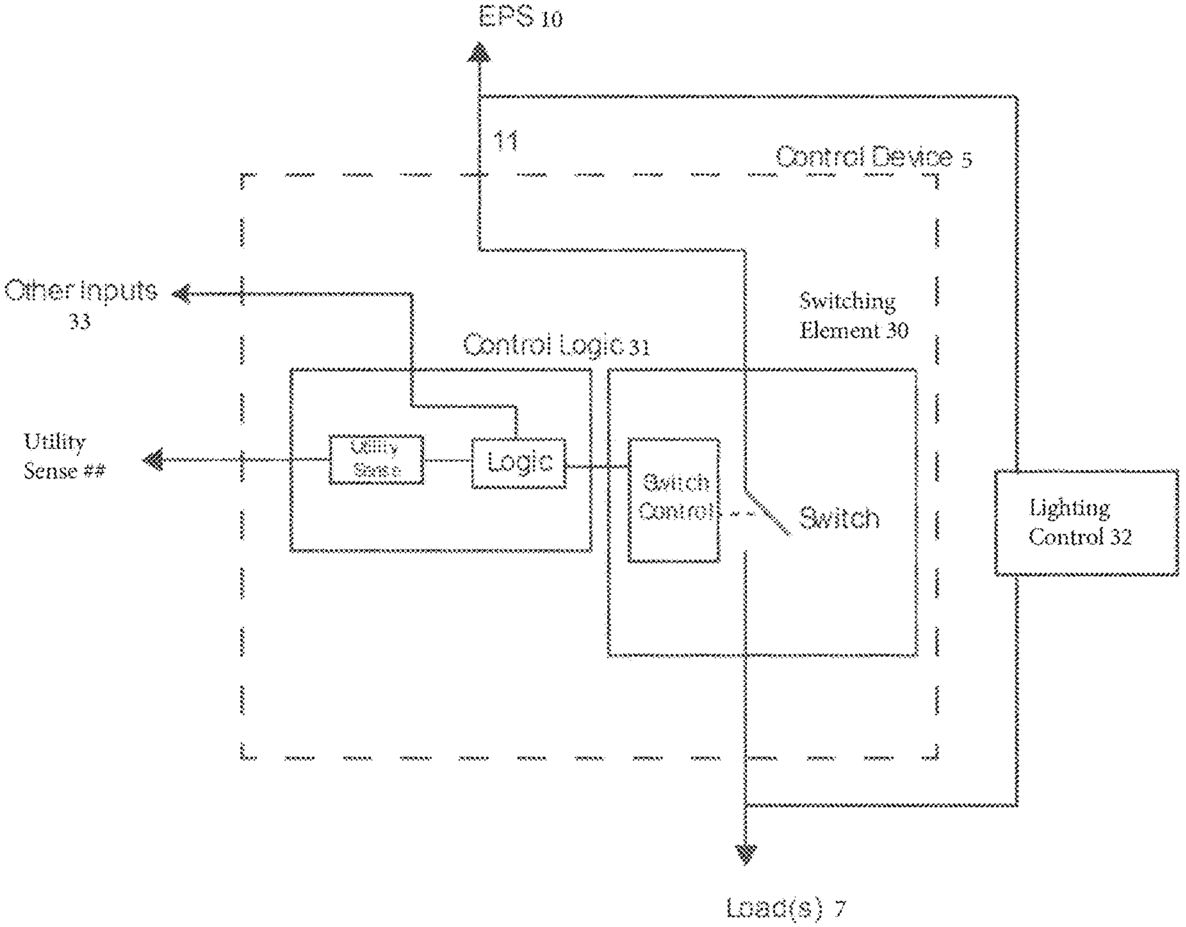
FIG. 7A is a block diagram of a prior art shunt type control device that requires a utility sense to set a switch position for emergency power.
Figure 7B:
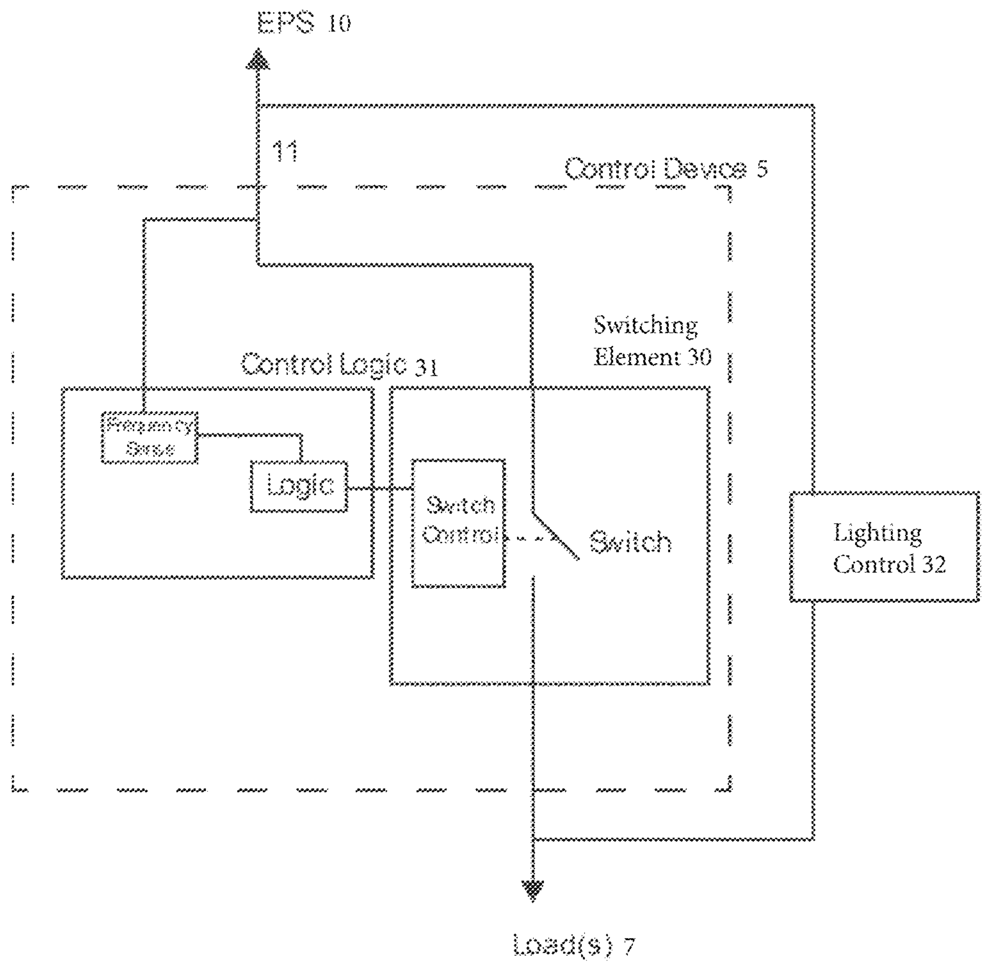
FIG. 7B is a block diagram of a shunt type control device according to an embodiment of the invention, which does not require a utility sense to set an emergency power switch position.

FIG. 7A is a prior art shunt type control device, which requires a utility sense to set the switch position. This topology is used when there is a dedicated external emergency lighting control that wraps around the control device (between terminal 7 and 11). FIG. 7B illustrates a shunt type control device using the present invention. As shown, using the present invention there is no need for a utility sense in the control logic.

Figure 8A:
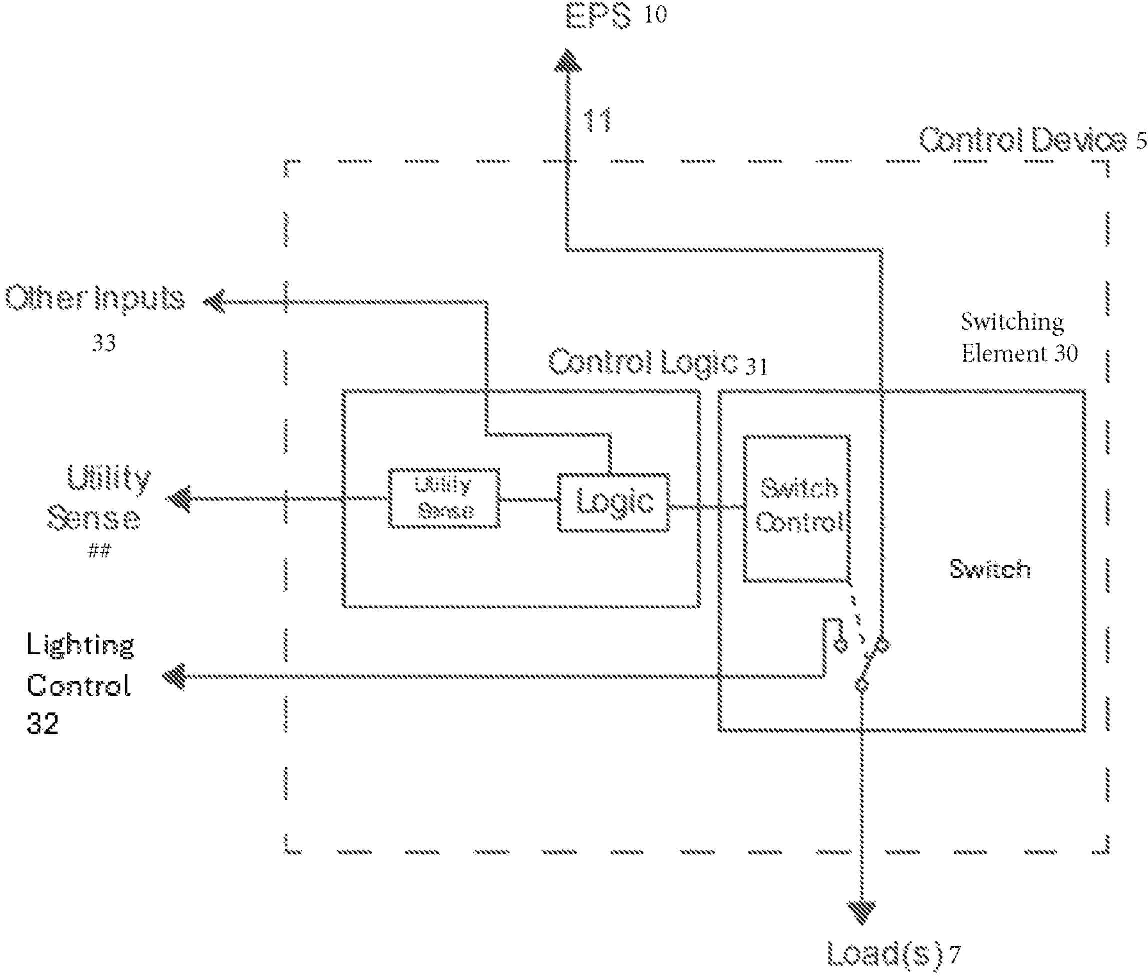
FIG. 8A is a block diagram of a prior art Automatic Transfer Switch (ATS) type control device, which requires a utility sense to set a switch position.
Figure 8B:
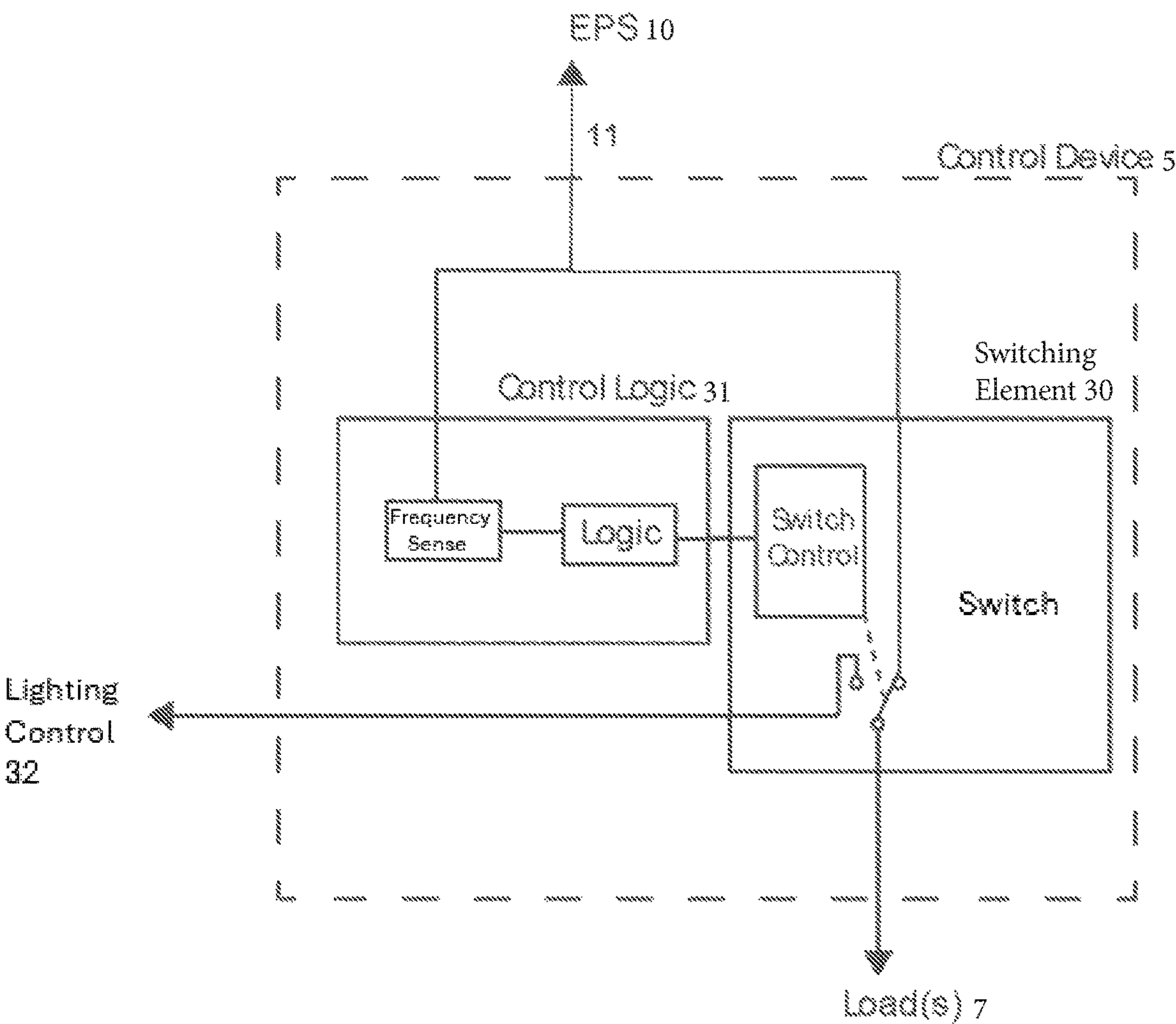
FIG. 8B is a block diagram of an ATS type control device according to an embodiment of the invention, which does not require a utility sense to set a switch position.

FIG. 8A is a prior art Automatic Transfer Switch (ATS) type control device, which requires a utility sense to set the switch position. This topology is used when there is a desire to transfer the load between the utility and EPS circuits. FIG.

8B illustrates an ATS type control device using the present invention. As shown, using the present invention there is no need for a utility sense in the control logic.

The invention having been thus described, it will be apparent to those of skill in the art that the same may be varied in many ways without departing from the spirit and scope of the disclosure. Any and all such variations are intended to be included in the scope of the following claims.

What is claimed is:

1. An emergency power system configured to automatically provide emergency power to a remote load in the event of a main power failure, comprising:

an emergency power supply device;

a control device configured to be connected to said emergency power supply device and to control the operation of said remote load; and a main controller configured to detect a condition of a magnitude, a phase, and/or a frequency of a power signal from a main power source, switch from a normal mode of operation in which power is supplied to said remote load from said main power source to an emergency mode of operation in which power is supplied to said remote load from said emergency power supply device, and to send a control signal to a power converter/inverter, of said emergency power supply device, in dependence on said mode of operation;

wherein said power converter/inverter is configured to vary, from a nominal value frequency and for first and second predetermined time periods respectively corresponding to a beginning and an ending of said emergency mode of operation, a magnitude and/or a phase of a fundamental frequency of a power waveform generated thereby and transmit said power waveform to said control device, in accordance with said control signal received from said main controller at said power converter/inverter, to communicate, entirely within a total time period of operation of said emergency mode of operation, said respective beginning and said respective ending of said emergency mode of operation to said control device via said transmitted power waveform;

wherein a variation in said magnitude and/or said phase of said fundamental frequency of said power waveform corresponds to a digital encoding for said emergency mode of operation; and wherein said control device is configured to, in response to receipt of said power waveform, interpret said variations in said magnitude and/or said phase of said fundamental frequency of said power waveform as each respectively corresponding to a predetermined digital code respectively representing said beginning or said ending of said emergency mode of operation, and to control said remote load in accordance with said beginning or said ending of said emergency mode of operation.

2. The emergency power system of claim 1, wherein said predetermined time period comprises two seconds.

3. The emergency power system of claim 2, wherein said magnitude and/or phase of said fundamental frequency are varied by pulse width modulation.

4. The emergency power system of claim 1, wherein said load is an illumination device.

5. A method of communication between an emergency power system and a remotely located control device for operating a load, comprising:

varying, from a nominal value frequency and for each of a first and a second predetermined time period entirely within an emergency mode of operation of said emergency power system, a magnitude and/or a phase of a fundamental frequency of a power signal waveform supplied, from a power converter/inverter, of said emergency power system, to said remotely located control device according to a predefined protocol, wherein said power signal waveform is based on a control signal transmitted to said power converter/inverter from a main controller of said emergency power system, wherein said remotely located control device detects said variation in said magnitude and/or said phase of a fundamental frequency of said power signal waveform, for each of said first and second predetermined time period, as respectively corresponding to said predefined protocol, determines said predefined protocol according to respective digital coding for said variation, and controls operation of said load in dependence on said predefined protocol, and wherein said first predetermined time period corresponds to a beginning of said emergency mode of operation and said second predetermined time period corresponds to an ending of said emergency mode of operation.

6. The method of communication as set forth in claim 5, wherein said predetermined time period comprises two seconds.

7. The method of communication as set forth in claim 5, wherein said load is an illumination device.

8. The method of communication as set forth in claim 5, wherein said predefined protocol indicates a mains power outage.

9. The method of communication as set forth in claim 5, wherein said predefined protocol indicates a fire emergency.

10. The method of communication as set forth in claim 5, wherein said predefined protocol indicates a test mode of said system.

* * * * *